United States Patent Office 3,128,759
Patented Apr. 14, 1964

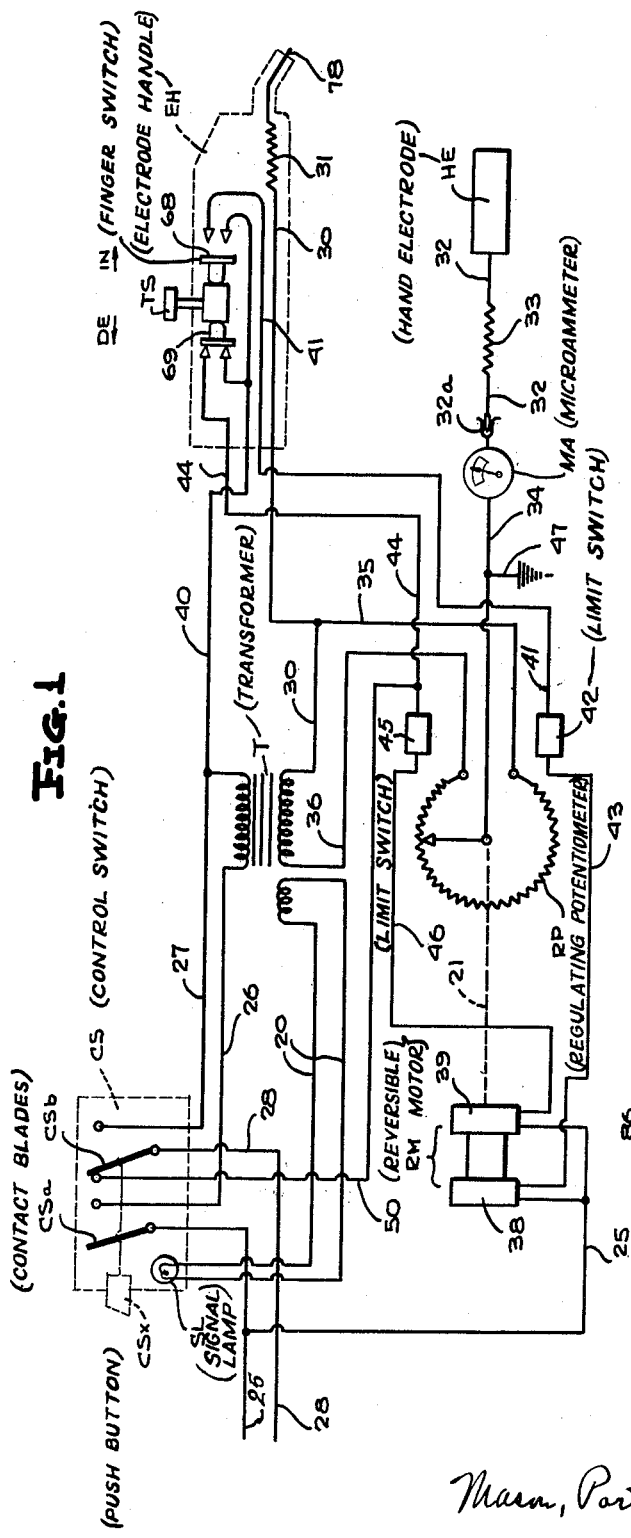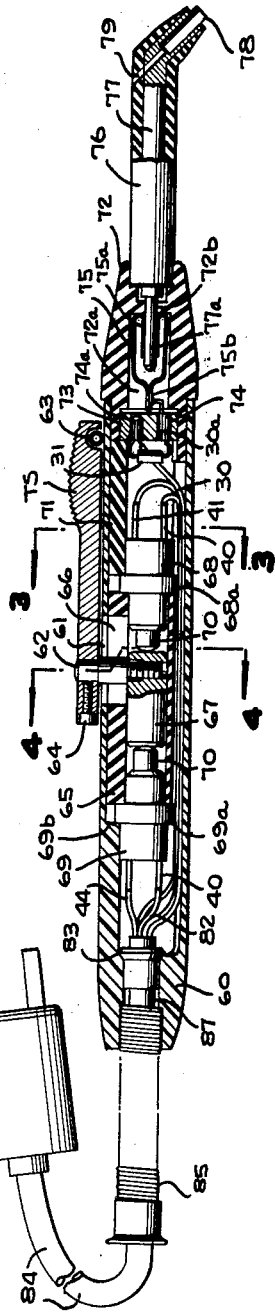

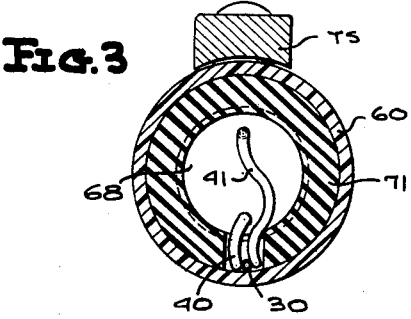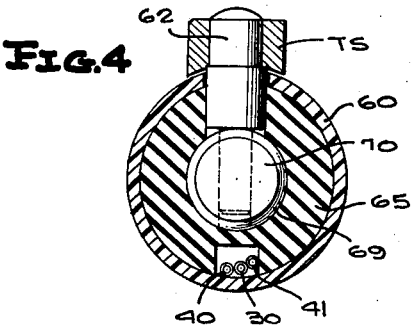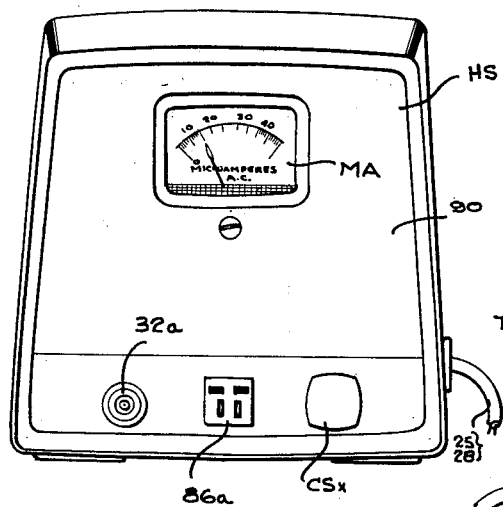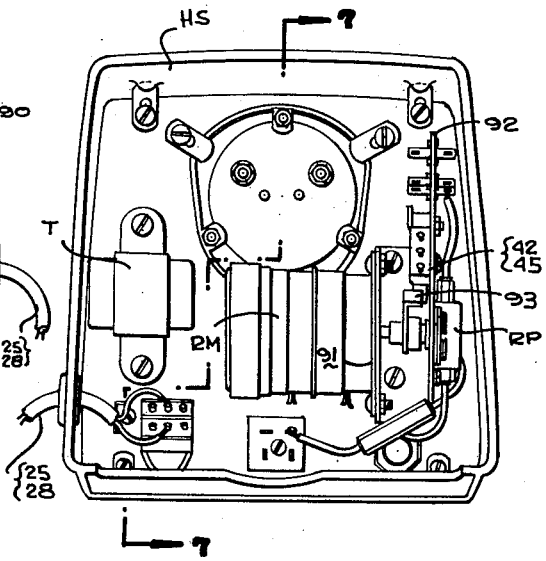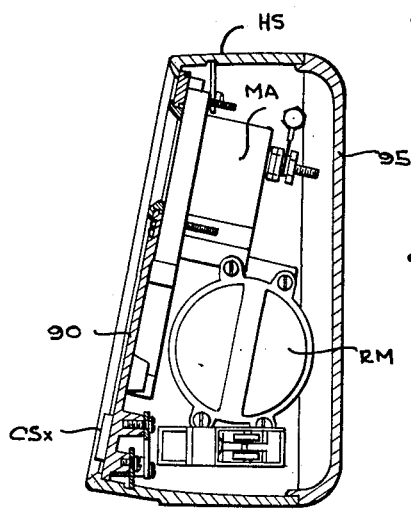

3,128,759
TOOTH VITALITY DETERMINING DEVICE
Richard P. Bellis, Old Bridge, N.J., assignor to The S. S. White Dental Manufacturing Company, Philadelphia, Pa., a corporation of Pennsylvania
Filed Mar. 10, 1961, Ser. No. 94,795
10 Claims. (Cl. 128—2.1)

This invention relates to an electrical system for testing resistive response: and is particularly adapted for use as a so-called "pulp tester" for use by dentists in determining the vitality of a tooth.

It is known to apply a pulse of electric current, in testing such vitality: but the accuracy of the test was usually dependent upon the patient's own physiological reaction to the excitation rather than the electrical response of the tooth tissues themselves. The dentist could set his device for a calibrated pulse, determine the reaction or lack of reaction, set the device for a different pulse, again determine the reaction, and so on. Such a device can include an electrical meter for indicating the strength of the individual pulse, and thus affording the dentist a cross-check as to the reaction being the same for each repetition of a setting: wherewith the amount of current necessary to produce a reaction is a function of the vitality of the tooth. Since the calibration was on a voltage basis, and the reaction is produced by current flow, variations of conductivity in the circuit made voltmeter determinations of the potential difference between the test and return electrodes an uncertain basis of calibration: such conductivity variations being produced, for example, by the moisture of the palm, the pressure of gripping the hand electrode, the specific resistance of the patient's flesh tissues, etc.

An object of the present invention is the provision of a testing system which permits accurate reading of the amperage flow, with manually controllable means for effecting continuous variation of the exciting voltage.

Another object is the provision of a testing system including a voltage divider for determining the potential difference being employed, with remote control means actuatable by the testing operator for shifting the voltage divider.

A further feature is the provision of a testing system including a voltage divider which can be shifted for determining the potential difference of the test current by means actuatable by the testing operator, and with means for returning the voltage divider automatically to an initial position after a series of tests has been made, so that each series of tests is begun with a predetermined low potential difference, e.g., zero, between the test electrodes.

A further feature is the provision of a test electrode holder with selective switches thereon for controlling the voltage employed in a test.

With these and other objects in view, as will appear in the course of the following description and claims, an illustrative embodiment of the invention is shown on the accompanying drawings, in which:

FIGURE 1 is a circuit diagram showing the connection of parts;

FIGURE 2 is an axial section of a test electrode holder;

FIGURE 3 is a radial section substantially on line 3—3 of FIGURE 2;

FIGURE 4 is a corresponding section substantially on line 4—4 of FIGURE 2;

FIGURE 5 is a front view of a cabinet for the indicator, potentiometer and control parts;

FIGURE 6 is a rear view of the same, with a rear closure removed;

FIGURE 7 is an upright section, substantially on line 7—7 of FIGURE 6.

The embodiment will be described on the basis of an illustrative remotely controlled variable voltage device, with preferred structures for such voltage device and for the remote control.

Current mains connections 28, 25 are at 115 volts potential. A transformer T has a primary winding and two secondary windings, one of high voltage for the test current, and other of low voltage effective by conductors 20 to operate a signal lamp SL when the system is in operating condition. The test electrode handle EH has the projecting test or probe electrode 78: and an externally accessible member TS for actuating switches within the holder. A reversible motor assembly or electromotive means RM actuates a low speed shaft 21 connected to a sweep arm of a regulating potentiometer RP: at the end positions of the potentiometer arm, the limit switches 45 for the maximum voltage position, and 42 for zero voltage position, are actuated from the shaft 21. A hand electrode HE is provided for the current return from the patient's body during testing, usually being gripped in the hand. The microammeter MA is provided to show the prevailing current strength at the test. The control switch CS has two contact blades, CSa, CSb; CSa being single pole and normally open when the system is not in use, CSb being double pole. The control switch CS may be of the known type, by which a first depression of a push button CSx moves the contact blades to "test" position, being the right-hand position in the drawing, while a second depression moves the contact blades to the left-hand position as shown. This assembly of contacts and push button may have the push button CSx translucent, and the lamp SL may be positioned so that the button shows illumination when the testing circuits are ready.

When the control switch CS is actuated to bring the system into operation, the contact CSa is closed, and current flows from conductor 25 through it and by conductor 26 to the primary winding of the transformer T, with a return by conductor 27 to the contact blade CSb of the two-pole assembly in switch CS and thence by conductor 28 back to the current source. Current from the low voltage secondary of the transformer T flows by conductors 29 and the lamp SL lights. Current from the high voltage secondary of transformer T flows by conductor 30 and the limiting resistor 31 to the test electrode 78, with return from the patient's body and the hand electrode HE by conductor 32 and the safety resistor 33 to the microammeter MA, and thence by conductor 34 to the adjustable contact arm of the potentiometer RP. When this arm is at the extreme counterclockwise position in the drawing, the conductor 35 holds the two electrodes at the same potential or at a present minimum voltage. As the contact arm moves clockwise, it engages parts of the potentiometer resistance at successively higher potential, and therewith successively greater potential differences are established between electrodes 78 and HE. A conductor 36 connects the other end of the potentiometer RP to the other terminal of the high voltage secondary of the transformer T, so that the potentiometer acts as a voltage divider.

The potentiometer arm is actuated from the reversible motor assembly RM which can include two tandem-connected shaded pole hysteresis motors mounted with gearing to drive the common shaft 21: for example, these motors may be of the type used in synchronous clocks, with a rating of about 4 watts and 3 r.p.m., being conventionally designated in FIGURE 1 as having two field windings 38, 39: when winding 38 is energized, the motor RM actuates the potentiometer arm in a clockwise direction, to increase the potential difference between the electrodes: and energization of the winding 39 causes the motor RM to move the arm counterclockwise and decrease the potential difference. Control of the motor movement is attained by switches 68, 69 selectively actuatable by the member TS of the electrode holder EH, set out in detail hereinafter. When current flows in conductor 27, it also flows through the branch 40 to the switches 68, 69. When the dentist desires the increase of the potential difference at the electrodes, he moves the member TS in the direction IN of FIGURE 1, to close the switch 68 and thus the circuit to conductor 41 and thence through the normally closed limit switch 42 and by conductor 43 to the motor winding 38 so that the potentiometer arm is slowly moved clockwise as long as the finger switch 68 causes current to pass to the conductor 41. When the dentist desires to decrease the potential difference, the member TS is actuated in the direction DE of FIGURE 1 to close the switch 69 and the circuit from conductor 40 to conductor 44 with flow through the second normally closed limit switch 45 and conductor 46 to the motor winding 39 so that the motor RM turns in the other direction and the potentiometer arm moves counterclockwise to reduce the potential difference at the electrodes so long as the finger switch 69 is so closed. The motor windings 38, 39, at their other terminals, are connected to supply conductor 25, independently of the control switch CS. When the finger switch TS is in central position, no current flows to the motor windings, the potentiometer arm remains in position, and the potential difference between the electrodes is maintained.

When the finger or actuator member TS is held in position with the circuit to conductor 41 closed, the movement of the shaft 21 ultimately causes the limit switch 42 to open when the arm reaches its position of maximum voltage effect, and the circuit to the motor winding 38 is opened so that the potentiometer is not damaged by excessive movement of the arm. Likewise, when the actuator member TS is held for closing the circuit to conductor 44, the limit switch 45 is opened as the potentiometer arm comes to zero position, for a like purpose. It will be noted that, in each case, motion in one direction is prevented: but motion in the other direction can be attained by movement of the finger member TS and the other switch 68 or 69 to close the other circuit and energize the other motor coil and procure movement of the shaft 21 until the opened limit switch 42 or 45 automatically returns to closed position.

The meter MA may be a conventional rectifier-type microammeter having an indicated range of 0 to 50 microamperes. The safety resistor 33 can have a rating of 33,000 ohms; and satisfies Underwriter's requirements of protection to the patient. The limiting resistor 31 can have a rating of 68,000 ohms and is located immediately at the detachable connection for the test probe: and serves to limit the current passed through the patient to a safe value even if the probe conductor 30 is accidentally connected to the power line directly.

The conductor 34 from the meter MA may be grounded by a branch conductor 47, wherewith a false meter reading is avoided.

Parts of the conductors 30, 32 may be contained in flexible cables for the desired movement and positioning of the electrode members EH and HE; and such cables can have grounded conductive braids for preventing capacitive effects.

An automatic resetting of the potentiometer arm to zero position is provided by the normally closed contact of the two-pole blade CS*b* in control switch CS. At the completion of a test, the switch CS is moved to its left hand position. Therewith, the current flow from conductor 25 through the single pole assembly to conductor 26 is opened, the transformer T is deenergized and the lamp SL goes out; and flow from conductor 28 to conductors 27, 40 is prevented at the double-pole blade CS*b*. The movement of the double-pole contact blade CS*b* closes a circuit from conductor 28 to conductor 50 which is a branch of conductor 44, thence through the limit switch 45 and motor winding 39 to the return conductor 25. The motor RM turns to move the potentiometer arm counterclockwise in the drawing, until it attains its zero position and the limit switch 45 opens.

During the testing, the adjusted potential difference between the electrodes provokes a current flow dependent upon the conductivity of the tooth being tested. This current flow is indicated by the meter MA. It is to be noted that this reading is only indirectly dependent upon the potential difference between the electrodes: that is, the potentiometer RP may have different settings for different patients, with the same reading appearing at the meter.

The structure of the test electrode holder TE is shown in FIGURE 2. The body comprises an outer sleeve 60 which preferably is of electrically insulating material and has a longitudinal slot 61 in which can be moved a pin 62 which extends through the sliding actuator TS and is secured thereto by a screw 64. Inside the sleeve 60 is a first insulating inner sleeve 65 having a slot 66 aligned with the slot 61. A sliding bar 67 is guided in and can be moved along the bore of sleeve 65 by the pin 62 which is threadedly connected therewith. Two switch devices 68, 69 are located at the ends of the actuator 67, each having a spring-pressed button 70 for movement by the actuator. Each switch device has a peripheral flange 68*a*, 69*a*; and the sleeve 65 extends between them to hold them spaced apart a distance such that when the actuator TS is in central position, both switch devices are open, and upon movement of the actuator in one or the other direction, one or the other device can have its switch contacts closed so that current can flow in the corresponding conductors. The flange 69*a* bears against an internal shoulder 69*b* of the body sleeve 60. A second insulating spacer sleeve 71 also fits inside the body 60 and bears against the flange 68*a*. An insulating nose piece 72 is force-fitted into the open end of the body sleeve 60, and bears against the sleeve 71, so that the parts 71, 68*a*, 68, 65, 69*a*, 60 are held against longitudinal shifting. The inner end of the nose piece 72 has a recess for a plug 73 of electrically insulating material such as a phenolic resin laminate. A metal sleeve or eyelet 74 extends through the plug 73, and a second sleeve 74*a* extends partly through it and is open at the rear and left-hand face of the plug in FIGURE 2: these sleeves can be inserted in the wet-laid laminate material before curing. In front and at the right in FIGURE 2, the nose piece 72 has a chamber 72*a* smaller than the recess for the plug 73 and having the end of sleeve 74 accessible thereat. A spring clip 75 is of folded sheet metal, with spring jaws 75*a* located behind a small axial hole 72*b* in the nose piece 72: the bight 75*b* can bear against the plug 73 and the jaws 75*a* against the end face of chamber 72*a* for restricting endwise movement of the clip. The bight 75*b* has a short length of wire 30*a* soldered to it and extending into the sleeve 74. A small resistor 31 has one end conductor in the sleeve 74, and the other in sleeve 74*a*. The conductor 30, described above, has its end in sleeve 74*a*. During preliminary assembly, the wire 30*a* and the first resistor conductor are electrically and mechanically secured by soldering into the sleeve 74: and a like connection between conductor 30 and the second conductor of the resistor is made at the sleeve 74*a*. The end of the nose piece 72 has a recess for receiving a tube 76 which is of insulating material and surrounds a metal conductor 77, from which an end pin 77*a* passes through the hole 72*b* and engages in the spring clip 75. It is preferred to have the outer ends of the tube 76 and conductor 77 directed at an angle to the general axis as shown, and to have a socket in the end of the conductor for receiving the orange wood test point 78: a hole 79 in the tube 76 being aligned with the socket so that a punch may be inserted for ejecting the point 78. The several conductors 30, 40, 41, 44, can be assembled in a harness cable 82 extending outwardly through the small axial bore 87 in body 60 and having the enlarged button 83 fixed thereto to prevent strain upon the internally independent conductors. The harness 82 can be covered with a braid or outer jacket 84, and excessive wear and flexing adjacent the hand electrode body 60 may be prevented by the surrounding coil spring 85. For quick connection, the harness 82 may be attached to a four-pole jack 86.

The sliding actuator TS can be moved back and forth, or released, by the thumb while the fingers grasp and direct the body 60. A small roller 63 may be provided near its free end, to travel in a groove in the body sleeve 60, for reducing the resistance to actuator movement and to hold it against rotation around the pin 62.

A suitable mounting for the indicating and current-determining parts is shown in FIGURES 5–7 as a housing HS having a front panel 90 on which is the meter MA; a single receptacle 32a for the pin end of conductor 32, FIGURE 1; a four-pole receptacle 86a for the jack 86, FIGURE 2; and the button CSx, FIGURE 1, which controls the switch blades CSa, CSb. Within this housing, as shown in FIGURE 6, are mounted the transformer T, and brackets 91, 92. The motor assembly RM has a flange bolted to the bracket 91; and the potentiometer RP is secured to bracket 92 so that its shaft can be directly connected to the motor-driven shaft 21, and a sweep arm 93 secured to the shafts for actuating the limit switches 42, 45 which can be of the commercial enclosed type with a projecting operating pin. A rear closure 95 is secured to the housing HS. The conductors 25, 28 can be contained in a jacket and led through a wall (FIGURES 5 and 6) of the housing HS, and thus to the switch assembly CS.

It is preferred to have the voltage dividing potentiometer RS of logarithmically tapered type, so that the potential variation is small per unit of angular movement at the low current end and substantially greater per unit of such movement at this high current end so that vital teeth which are sensitive to current can be excited by a slowly rising current, and non-vital teeth which are relatively insensitive can be excited by a rapidly rising current at the high current end of the potentiometer. In this way, the reading for each tooth of a patient, and of successive patients, can be attained accurately and with a minimum of discomfort.

It is obvious that the invention is not restricted to the illustrative embodiment, and that it may be practiced in many ways within the scope of the appended claims.

What is claimed is:

1. A tooth vitality determining device comprising a source of electrical energy, a return electrode for contact with the patient, an insulating electrode holder having an electrode adapted to be applied to the tooth being tested, a voltage dividing device connected to said source and including a voltage selecting element connected to said return electrode with the other electrode having a return connection to the source, a current-measuring device connected in series between said return electrode and the source and effective for indicating the current flowing between the electrodes at the prevailing position of the voltage selecting element, electromotive means to move said voltage selecting element for increasing or decreasing the voltage applied at the electrodes, and electric circuit means including switches for selectively energizing said electromotive means.

2. A device as in claim 1, in which the said switches are located on the electrode holder.

3. A device as in claim 1, in which the said electric circuit means includes limit switches connected to the respective selectively energizing switches, and limit-determining means are connected to said selecting element for actuating the limit switches.

4. A tooth vitality determining device comprising a source of electrical energy, a return electrode for contact with the patient, an insulating electrode holder having an electrode adapted to be applied to the tooth being tested, a voltage dividing potentiometer including a resistance connected in series with said source and a variable tap on said resistance connected to said return electrode, the other electrode being connected to one end of said resistance, a current-measuring device connected in series between one of said electrodes and the potentiometer for reading the current intensity flowing in the patient's body between the electrodes, reversible electromotive means to move said variable tap along the said resistance, and electric circuit means including a flexible insulated conductor cable for said connections of the electrode holder with the voltage dividing potentiometer, and switches mounted on the said electrode holder and connected through said cable to the reversible electromotive means for selectively energizing the said electromotive means and producing movements in either direction and standstill thereof.

5. A device as in claim 4, including a limit switch connected in said circuit means for interrupting energization of the electromotive means when said tap is at a predetermined low voltage position, a main switch having first contacts effective when closed for supervising the amount of current to said potentiometer and to said selectively energizing switches and also having a second contact which is open when the first contacts are closed and closed when said first contacts are open, and a conductor included in said circuit means independent of said main switch for delivering current from said second contact through said limit switch and effective to cause movement of said tap to said low voltage position when said first contacts are opened.

6. A device as in claim 4, including a main switch for controlling current flow from said source by a first contact to said potentiometer and selective switches when the main switch is in one position whereby the tap position on the resistance can be raised, limit switches included in said circuit means and controlled by the tap position for determining the maximum and minimum voltages which may be imposed upon said electrodes, and a second contact in said main switch connected in series with the minimum voltage determining limit switch and the electromotive means for procuring an automatic return of the tap to minimum voltage position when the said first contact of the main switch is opened.

7. A tooth vitality determining device including an insulating holder including a hollow outer sleeve, a pair of opposed momentary circuit-closing switches having their bodies in the sleeve, an actuator mounted externally on said holder and a member connected therewith for selectively effecting closure of said switch dependent upon the direction of movement of said actuator, an insulating end closure for said sleeve and an extension therefrom, an electrode in said extension and projecting therebeyond adapted to be applied to the tooth being tested, one said switch having its body engaged with an internal shoulder in the sleeve, and spacer means between the switch bodies and between the other said switch and said end closure.

8. A device as in claim 7, in which the actuator connected member includes an element positioned in the outer sleeve and between said switches, in which the periphery of the outer sleeve has an axially directed slot, and in which a pin is threaded into said element and extends through said slot and is connected to said actuator.

9. A device as in claim 7, in which the spacer elements are sleeves of insulating material and have aligned radially outward axial grooves, and conductors extending from the electrode and one said switch and located in said grooves and within the outer sleeve.

10. A tooth vitality determining device comprising a source of electrical energy, a return electrode for contact with the patient, an insulating electrode holder having an electrode adapted to be applied to the tooth being tested, a voltage dividing device connected to said source and including a voltage selecting element connected to said return electrode with the other electrode having a return connection to the source, a current-measuring device connected in series between said return electrode and the source, electromotive means to move said voltage selecting element for increasing or decreasing the voltage applied at the electrodes, a flexible insulated conductor cable connecting the holder with the voltage selecting element and electromotive means, and electric circuit means including switches on the electrode holder for selectively energizing said electromotive means.

References Cited in the file of this patent

UNITED STATES PATENTS

| | | |
|---|---|---|
| 2,522,052 | Logan | Sept. 12, 1950 |
| 2,949,107 | Ziegler | Aug. 16, 1960 |